PNEUMATIC NUT ELEVATOR

Filed Dec. 18, 1961 3 Sheets-Sheet 1

INVENTOR.
FRITZ J. LUPO
BY
Barnes, Kisselle, Raisch & Choate
ATTORNEYS

PNEUMATIC NUT ELEVATOR

Filed Dec. 18, 1961

INVENTOR.
FRITZ J. LUPO

BY
Barnes, Kisselle, Raisch & Choate
ATTORNEYS

INVENTOR.
FRITZ J. LUPO
BY
Barnes, Kisselle, Raisch & Choate
ATTORNEYS

United States Patent Office 3,163,324

Patented Dec. 29, 1964

3,163,324

PNEUMATIC NUT ELEVATOR

Fritz J. Lupo, Southfield, Mich., assignor to Feedmatic-Detroit, Inc., Southfield, Mich., a corporation of Michigan Filed Dec. 18, 1961, Ser. No. 160,209

5 Claims. (Cl. 221—68)

This invention relates to a nut feeding device.

In the feeding of small parts, such as nuts in a production set-up, it is important that these nuts be fed to a press, for example, where they are incorporated into a part. A gravity feed mechanism for an orienting hopper in which the hopper is mounted above the machine has the disadvantage that it must be fed from an elevation above the machine. This requires an operator to climb a ladder to dump a fresh supply, or some other means of elevating the bulk parts to the hopper.

Another means of feeding the parts to avoid this elevation has been a floor level hopper with a mechanical force-feed of the parts to the machine such as a press. This has had some disadvantages in that the force feed has damaged the sensing devices which are provided to prevent a no-part, no-motion action, and the force feed is subject also to the problem of a certain amount of pressure on the parts moving toward the machine.

It is found that the gravity feed of the parts to the machine is probably the best system for control, and it is an object of the present invention to permit the use of this gravity feed and also to permit a floor level hopper. This is accomplished briefly by providing a hopper which distributes to one or more outlet tracks feeding into a transfer block which aligns the parts with an elevator track and also with a fluid nozzle. Once the parts are thus aligned, a synchronized valve operates to blow the parts up the track to a level above the machine where they may then fall by gravity to the open feed chute of standard construction.

Another object of the invention is to provide a device which is responsive to the level of the parts in the gravity feed track so that the operator can be warned if the "head" of the parts in the track decreases below a certain level.

Another object of the invention is to provide a device in which the parts actually float through the elevator track, thus reducing wear on the track and preventing jamming at this portion of the travel.

Other objects and features of the invention relating to details of construction and operation will be apparent in the following description and claims.

Figure 1:
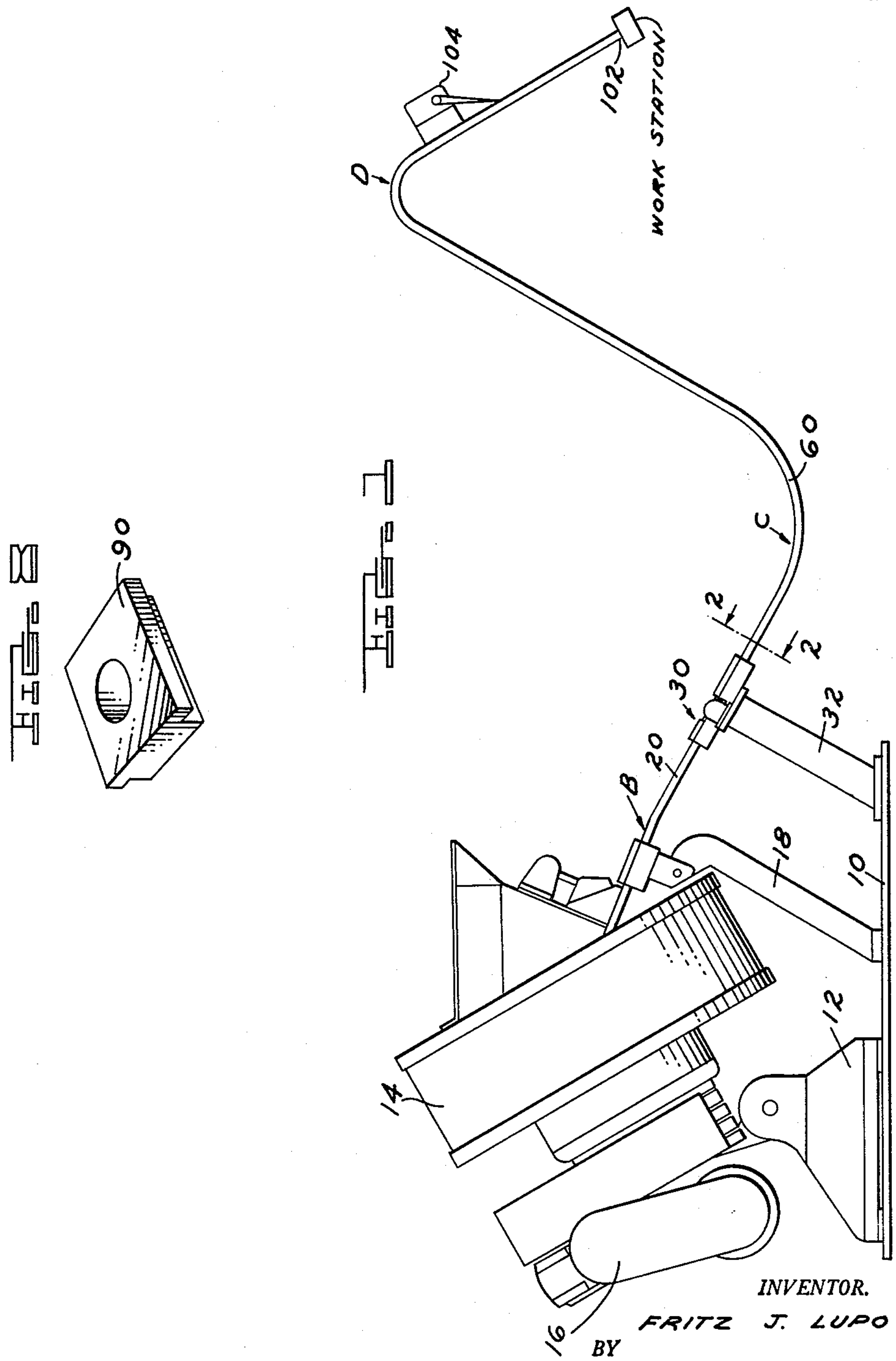

Drawings accompany the disclosure, the various views thereof being briefly described as follows:

FIGURE 1, a layout of the assembly showing the general relationship of the parts.

Figure 2:
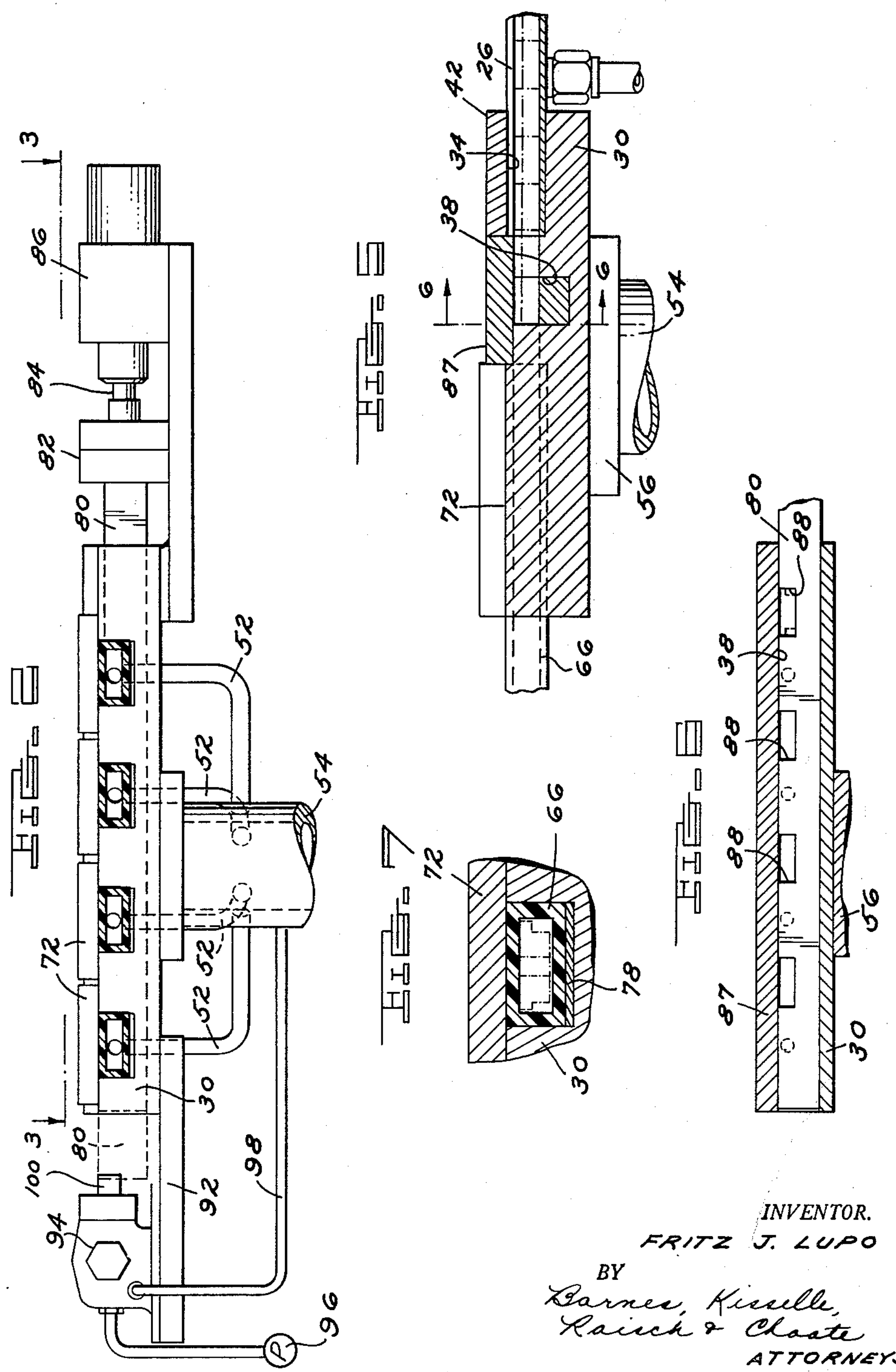

FIGURE 2, a sectional view on line 2—2 of FIGURE 1.

Figure 3:
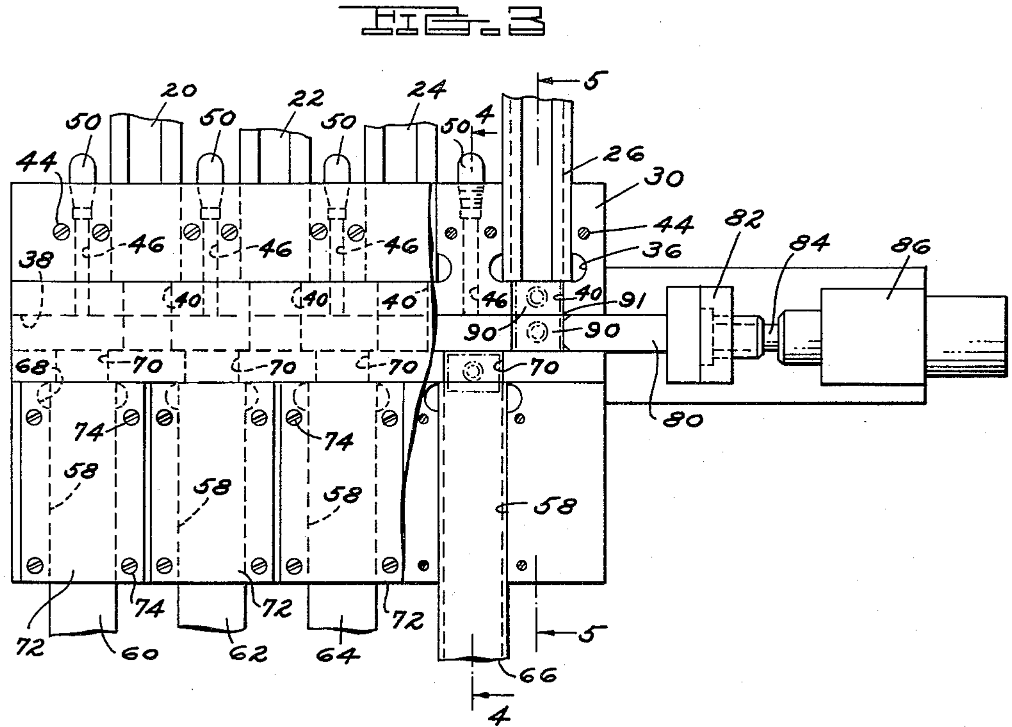

FIGURE 3, a top elevation of the actuator device taken on line 3—3 of FIGURE 2.

Figure 4:
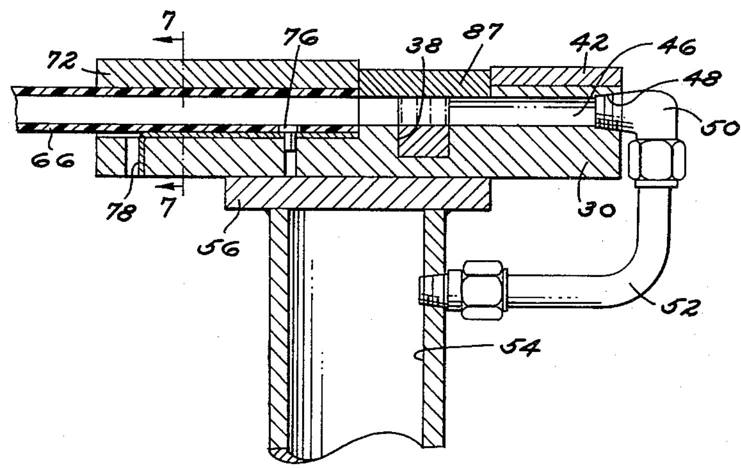

FIGURES 4 and 5, sectional views on line 4—4 and 5—5 of FIGURE 3.

FIGURE 6, a section on line 6—6 of FIGURE 5.

FIGURE 7, a sectional view on line 7—7 of FIGURE 4.

FIGURE 8, a perspective view of an example of a nut which can be handled by the mechanism to be described.

Referring to the drawings:

The device to be described is designed to be used in conjunction with a feeding mechanism for parts which are used in a production assembly job. For example, clinch nuts are used in automotive production, these nuts being fed to a machine which installs them in suitable apertures in a sheet metal piece so that the piece can be assembled later into an automotive body. The unit is designed to elevate nuts to a proper height and to a bank track section to allow gravity feed into an inserting mechanism, thus allowing the nut feeding equipment to remain on floor level to facilitate ease of loading and maintenance.

In FIGURE 1, the floor level is indicated by a plate 10 supporting a hopper base 12 which in turn supports a rotating hopper 14 and suitable adjusting and drive mechanism 16. Supporting adjacent the discharge hopper 14 by a bracket 18 is a bank of track sections 20, 22, 24 and 26 which have the discharge ends away from the hopper mounted in one side of an actuator block 30. The gravity chutes 20, 22, 24, and 26 can be made of extruded brass. The block 30 is mounted on a bracket 32 supported at floor level, and this block has openings 34 to receive the tracks which abut against the wall of a chamber 36 at the end of the openings 34. The chamber 36 is connected to a lineal passage 38 extending through the block transversely of the tracks by a short inlet port 40 leading from the terminal ends of tracks 20, 22, 24 and 26. A plate 42 overlies the ends of the tracks and is held in place by screws 44.

Between the track entries in block 30 are air passages or flow ports 46 which terminate in a tapped entry 48 for receiving an air connection elbow 50, each of which is connected by a second pipe connection 52 to a manifold passage 54 below the housing 30, terminating at a plate 56. These passages 46 terminate at the lineal passage 38.

On the opposite side of the block 30 laterally offset from the tracks 20, 22, 24 and 26 but in alignment with air passages 46 are additional track recesses 58 for receiving, respectively, outlet tracks 60, 62, 64 and 66. These recesses 58 again terminate in an enlarged recess 68 and the tracks butt against the wall of the recess 68 in alignment with outlet ports 70. Ports 70 are in direct alignment across the passage 38 with the blow ports 46 and are of the same dimension as the offset openings 40 on the other side of the lineal passage 38.

Cover plates 72 held in place by suitable bolts 74 overlie the tracks 60, 62, 64 and 66 and clamp these tracks in place. As shown in FIGURE 4, track buttons 76 may also be used in conjunction with a track clip 78.

Referring to FIGURE 6, there is shown a distributor bar or shuttle 80 in the lineal passage 38 in the housing 30, this distributor bar being coupled at 82 to a piston 84 projecting from a short actuating cylinder 86. The distributor bar 80, retained by plate 87, is provided with four recesses 88 dimensioned to about the same cross section as the track opening which, as shown in FIGURE 3, can receive nuts 90 from track 26, and, when actuated by cylinder 86, move these nuts to a position aligned with outlet ports 70 adjacent the entrance to track 66. Thus nuts from track 20 can be shifted to align with track 60, track 22 to track 62, track 24 to 64, etc. The shuttle thus loads four nuts 90 from the feed tracks in bank B and shifts them all to an alignment with the outlet tracks in bank C. The shuttle bar, of course, blocks the nut inlets 40 while a particular part is being shifted. A chamfered corner 91 (FIGURE 3) permits movement of the shuttle below the gravity fed parts column in each case. The tracks in bank C, that is, 60, 62, 64 and 66 are preferably formed of an extruded plastic which can be shaped to the configuration shown, for example, in FIGURE 1 to lead to any particular nut receiving machine which applies the nuts to the part for which they are intended.

As shown in FIGURE 2, there is supported on the housing 30 an extension plate 92 which supports a two-way air valve 94 which is suitably connected to a pressure supply 96 of air and also through a conduit 98 to the manifold 54 connected to the pipe outlet 52. Thus, the left-hand end of the shuttle bar 80 can serve as an actuator for the end of a valve piston 100 so that as the shuttle bar reaches its position of registry with the ports 70, it will actuate the valve 94, causing air to enter the passages 52, 50 and 46 to propel nuts in the recesses 88 of the shuttle bar through the ports 70 and into the track 60. These nuts by their momentum thus obtained will shoot through the bank C to an outlet 102 at a suitable machine (not shown) for utilizing the nuts. A sensing device 104 is provided to stop the operation in the event there is some failure in the nut supply. Thus, the nuts may be elevated to a point D which, depending on the amount of air pressure used, can vary to any desirable height to obtain the vertical gravity feed pressure desired at the outlet. Meanwhile, the nut supply hopper and the actuating mechanism is at floor level so that maintenance of equipment is simple and the filling of the hopper is no problem.

It has been found also that the air propulsion of the nuts through the bank C somehow insulates the nuts from contact with the tracks so that the tracks have a relatively long life as compared with tracks which are utilized with a mechanical push feed. The shuttle 80 is readily actuated in a known manner at the rhythm desired either by an air cylinder or a solenoid cylinder 86.

I claim:

1. A device for feeding small fungible parts to an elevated position from which a gravity feed may be effected which comprises:
   (*a*) an orienting device positioned generally at floor level,
   (*b*) a track leading from said orienting device downwardly and thence upwardly to the elevated position for carrying a single column of said parts,
   (*c*) a source of fluid under pressure, and
   (*d*) means positioned in the lower segment of said track for directing a blast of fluid from said source to individual parts in the line of movement along said track to propel parts to the elevated position of said track where they may fall by gravity toward a work station, said last mentioned means comprising:
      (1) a housing having laterally staggered inlet and outlet openings connected to said track,
      (2) means slidable in said housing having an opening to receive a single part from the inlet opening and move it out of alignment with the inlet opening and into alignment with the outlet opening and a fluid port connected to said source of pressure directed toward said outlet opening, and
      (3) valve means to control said fluid and direct it toward said outlet as a part is moved into alignment therewith.

2. A device for feeding small fungible parts to an elevated position from which a gravity feed may be effected which comprises:
   (*a*) an orienting device positioned generally at floor level,
   (*b*) a plurality of tracks leading from said orienting device downwardly and thence upwardly to the elevated position for carrying in each of said tracks a single column of said parts,
   (*c*) a source of fluid under pressure, and
   (*d*) means positioned in the lower segment of said tracks for directing a blast of fluid from said source to individual parts in the line of movement along said tracks to propel parts to the elevated position of said tracks where they may fall by gravity toward a work station, said last-mentioned means comprising:
      (1) a housing having a plurality of parallel inlets on one side connected to the respective tracks to receive individual parts from the respective single column, gravity-feed tracks,
      (2) a plurality of part outlets laterally spaced from said inlets opening to the other side of said housing,
      (3) a plurality of nozzle ports positioned adjacent said outlet ports in alignment with the line of travel of said tracks,
      (4) a shuttle bar between said inlets and said outlets having a plurality of openings to receive individual parts from each of said inlets and shiftable to move said parts to alignment with said outlets and said nozzle ports, and
      (5) valve means to connect said source of pressure to said outlets to cause pneumatic propulsion of said parts from said shuttle bar through said outlets to the elevated position of said track.

3. A device as defined in claim 2 in which said valve means has an actuator positioned to be shifted by said shuttle bar as it moves parts to alignment with said outlets.

4. A device for feeding of small fungible parts which comprises:
   (*a*) a floor level feed hopper,
   (*b*) a gravity chute for receiving oriented parts from said hopper and transferring them single file to an outlet of said chute,
   (*c*) a feed track having an inlet offset from said chute outlet, said feed track having a pneumatic propulsion section extending from said inlet thereof to a high level point adjacent a receiving station and a gravity section extending downwardly from said point to the receiving station, and
   (*d*) a transfer mechanism interposed between said chute outlet and track inlet comprising:
      (1) a stationary member
      (2) a member movable adjacent said stationary member between first and second positions, said movable member having a part-carrying pocket registering at one end with said outlet in said first position of said movable member for receiving a part from said outlet and closed at the other end by said stationary means to retain the part in the pocket, said movable and stationary members being respectively adapted to close said outlet and said other end of said pocket during movement of the pocket intermediate said positions, one of said ends of said pocket registering with said inlet in the second position of said movable member, and
      (3) pneumatic means including a port in said stationary member registering with said pocket in the second position of said movable member for pneumatically driving the part from said pocket into said inlet and then through said pneumatic section of said feed track to said gravity section thereof.

5. A device for feeding small fungible parts comprising: an orienting device, a plurality of gravity-feed tracks leading initially downwardly from said orienting device each adapted to receive oriented parts from said device and to slidably guide the parts in each of said tracks in a single column of said parts to an outlet of each track, a housing having a plurality of parallel inlets connected one to each of the outlets of the tracks to receive individual parts from the respective gravity-feed tracks, a guideway in said housing extending transversely to said inlets with said inlets opening to said guideway, said housing further having a plurality of part outlets one for each of said inlets laterally spaced from and extending parallel to said inlets and opening to one side of said guideway, a plurality of pneumatic feed tracks one connected to each of said part outlets, said housing also having a plurality of nozzle ports one for each of said outlets opening to the side of said guideway opposite said one side thereof in alignment with the associated outlet, a shuttle bar reciprocable in said guide way and having a plurality of slots one for each of said inlets and outlets extending through said bar parallel to said inlets and outlets and adapted to receive a part from the associated inlet and shiftable to move said parts into alignment with the associated outlets and nozzle ports, said shuttle bar slidably engaging the succeeding parts of the part column disposed in said inlets to support the same when the shuttle bar is shifted to move said slots out of registry with said inlets, a source of fluid under pressure and means to connect said source to said nozzle ports to cause fluid propulsion of said parts from said slots of said shuttle bar through said outlets into said associated feed tracks when said slots register with said outlets.

References Cited in the file of this patent

UNITED STATES PATENTS

| | | |
|---|---|---|
| 2,342,680 | Melzer | Feb. 29, 1944 |
| 2,540,604 | Van Sittert et al. | Feb. 6, 1951 |
| 3,038,637 | Zakrzewski et al. | June 12, 1962 |